United States Patent [19]
Merkle et al.

[11] Patent Number: 5,542,544
[45] Date of Patent: Aug. 6, 1996

[54] APPARATUS AND METHOD FOR SEPARATING LOW DENSITY SOLIDS FROM AN AIRFLOW

[75] Inventors: Cliff Merkle, Wheat Ridge; John Burns, Westminster; Gordon Laib, Littleton; Jim Willis, Englewood; Scotty Mitchel, Golden; Dennis Erickson, Arvada, all of Colo.

[73] Assignee: Coors Brewing Company, Golden, Colo.

[21] Appl. No.: 328,048

[22] Filed: Oct. 24, 1994

[51] Int. Cl.6 .................................................. B07B 7/00
[52] U.S. Cl. ........................................ 209/139.1; 209/154
[58] Field of Search .............................. 209/138, 139.1, 209/134, 135, 154, 133

[56] References Cited

U.S. PATENT DOCUMENTS

| | | | |
|---|---|---|---|
| 1,675,941 | 7/1928 | Lindsay | 209/716 |
| 1,897,144 | 2/1933 | Prouty | 209/716 |
| 1,928,702 | 10/1933 | O'mara | 209/716 |
| 2,165,946 | 7/1939 | Smith | 209/139.1 |
| 2,236,548 | 4/1941 | Prouty | 209/716 |
| 2,252,581 | 8/1941 | Saint-Jacques | 209/716 |
| 3,817,458 | 5/1974 | Gilberto . | |
| 4,222,529 | 9/1980 | Long . | |
| 4,795,103 | 1/1989 | Lech . | |
| 4,867,384 | 9/1989 | Waltert . | |
| 4,874,134 | 10/1989 | Wiens . | |
| 4,988,044. | 1/1991 | Weitzman et al. . | |
| 5,333,797 | 8/1994 | Becker et al. . | |

*Primary Examiner*—William E. Terrell
*Assistant Examiner*—T. Kelly
*Attorney, Agent, or Firm*—Klaas, Law, O'Meara & Malkin, P.C.; Joseph J. Kelly

[57] ABSTRACT

Apparatus and method for separating low density solids from an airflow where a first airflow containing low density solids moves through a first conduit at a predetermined velocity and pressure and flows into a separating chamber wherein it is changed into a second airflow at a substantially reduced velocity and pressure to separate a substantial portion of the low density solids and moves out of the separating chamber through one of a second or third conduits as a third airflow at a velocity and pressure substantially the same as that of the first airflow and also passes through filtering apparatus in the second or third conduits to separate additional low density solids out of the third airflow.

19 Claims, 2 Drawing Sheets

APPARATUS AND METHOD FOR SEPARATING LOW DENSITY SOLIDS FROM AN AIRFLOW

FIELD OF THE INVENTION

This invention relates generally to the recycling of glass wherein vacuum means are employed to separate low density solids from crushed glass particles and more particularly to the removal of the low density solids from the airflow generated by the vacuum means.

BACKGROUND OF THE INVENTION

In one of the operations to recycle glass, the glass is crushed and passed through several stages one of which involves the use of vacuum means to separate low density solids, such as plastic, paper, foil, cork and wood, from the crushed glass. This creates a problem in that the airflow containing the low density products will,plug baghouses, dust collectors or other similar apparatuses needed to process the airflow before passing it to the atmosphere. In some instances, the airflow is passed through cyclone separators which are expensive and somewhat inefficient for this type of service.

BRIEF DESCRIPTION OF THE INVENTION

This invention provides apparatus and method for removing low density solids, such as plastic, paper, foil, cork and wood, from an airflow using a separating chamber wherein the velocity and pressure of the airflow is greatly reduced so that a substantial amount of the low density solids fall out of the air flow into a collection means.

In a preferred embodiment of the invention, the apparatus for separating the low density solids from the airstream comprises a housing having an entrance opening. A first conduit is mounted on the housing and is connected to the entrance opening for receiving a first airflow containing low density solids. The housing has a separating chamber formed therein for separating a substantial portion of the low density solids from the airflow. The first conduit guides the first airflow for movement into the separating chamber. A second conduit is mounted in the housing and has an entrance opening facing the separating chamber. A third conduit is mounted in the housing and has an entrance opening facing the separating chamber. Blower means are provided for inducing the first air flow, a second air flow in the separating chamber and a third air flow alternately in the second or third conduit. The separating chamber has a cross-sectional area that is substantially greater than the cross-sectional area of the first, second or third conduits so that the second air flow has a velocity and pressure that is substantially less than the velocity and pressure of the first and third air flows so that the substantial portion of the low density solids fall out of the second air flow. A first gate is mounted on the second conduit for sliding movement relative to the entrance opening thereof to open or close the entrance opening to the separating chamber. A second gate is mounted on the third conduit for sliding movement relative to the entrance opening thereof to open or close the entrance opening to the separating chamber. First collection means are provided for collecting the substantial portion of the low density solids removed in the separating chamber. Each of the second and third conduits has an exit opening. Filtering means are provided in each of the second and third conduits for separating additional low density solids from the third airflow. The filtering means are located in the second and third conduits between the entrance opening and the exit opening. A third gate is mounted on the second conduit for sliding movement relative to the exit opening thereof to open or close the exit opening and a fourth gate is mounted in the third conduit for sliding movement relative to the exit opening thereof to open or close the exit opening. First removing means are provided for removing the additional low density solids from the filtering means in the second conduit and second removing means for removing the additional low density solids from the filtering means in the third conduit. A fourth conduit is mounted in the housing and has one end portion having an opening in communication with the second conduit. Second collection means are connected to the other end portion of the fourth conduit for collecting the additional low density solids removed from the filtering means in the second conduit. A fifth conduit is mounted in the housing and has one end portion having an opening in communication with the third conduit. Third collection means are connected to the other end portion of the fifth conduit for collecting the additional low density solids removed from the filtering means in the third conduit.

The housing comprises an upper portion having a generally rectangular cross-sectional configuration and a lower portion in the shape of an inverted truncated four sided pyramid. The first conduit, the second and third conduits and the fourth and fifth conduits comprise an integral front wall, an integral back wall, integral opposite side walls and a central baffle plate extending between and secured to the front and back walls. The first collections means comprises a sixth conduit having an end portion having an opening facing the lower portion. A fifth gate is mounted on the sixth conduit for sliding movement between a first location preventing movement of the substantial portion of the low density solids through the sixth conduit and a second location for permitting movement of the substantial portion of the low density solids through at least a portion of the sixth conduit. A sixth gate is mounted on the sixth conduit for sliding movement between a first location preventing movement of the substantial portion of the low density solids through another portion of the sixth conduit and a second location for permitting movement of the substantial portion of the low density solids through the another portion of the sixth conduit. The second collection means comprise a seventh conduit having an end portion connected to the other end portion of the fourth conduit. An eighth gate is mounted on the seventh conduit for sliding movement between a first location for preventing movement of the additional low density solids through the seventh conduit and a second location for permitting movement of the additional low density solids through the seventh conduit. The third collection means comprise an eighth conduit having an end portion connected to the other end portion of the fifth conduit and a ninth gate mounted on the eighth conduit for sliding movement between a first location for preventing movement of the additional low density solids through the eighth conduit and a second location for permitting movement of the additional low density solids through the eighth conduit.

A method for separating low density solids from an airflow is provided and comprises moving a first airflow containing low density solids through a first conduit at a predetermined velocity and pressure into a separating chamber; moving a second airflow through the separating chamber at a velocity and pressure substantially less than the velocity and pressure of the first airflow to separate a substantial portion of the low density solids from the second air flow; collecting the substantial portion of the low density solids from the separating chamber and moving a third airflow out of the separating chamber through a second or a third conduit at a velocity and pressure substantially equal to the velocity and pressure of the first airflow. The method further comprises passing the third airflow through filtering means in the second or third conduits to separate additional low density solids. Each of the second and third conduits has an entrance portion and an exit portion and a slidable gate to open or close each of the entrance or exit portions and wherein the method further comprises opening the slidable gates at the entrance and exit portions of one of the second or third conduits; closing the slidable gates at the entrance and exit portions of the other of the second or third conduits; cleaning the filtering means in the other of the second or third conduits and collecting the additional low density solids. The method further comprises creating a vacuum downstream of the second or third conduits to induce the first, second and third airflows.

BRIEF DESCRIPTION OF THE DRAWING

An illustrative and presently preferred embodiment of the invention is illustrated in the drawings in which.

DETAILED DESCRIPTION OF THE INVENTION

Figure 1:
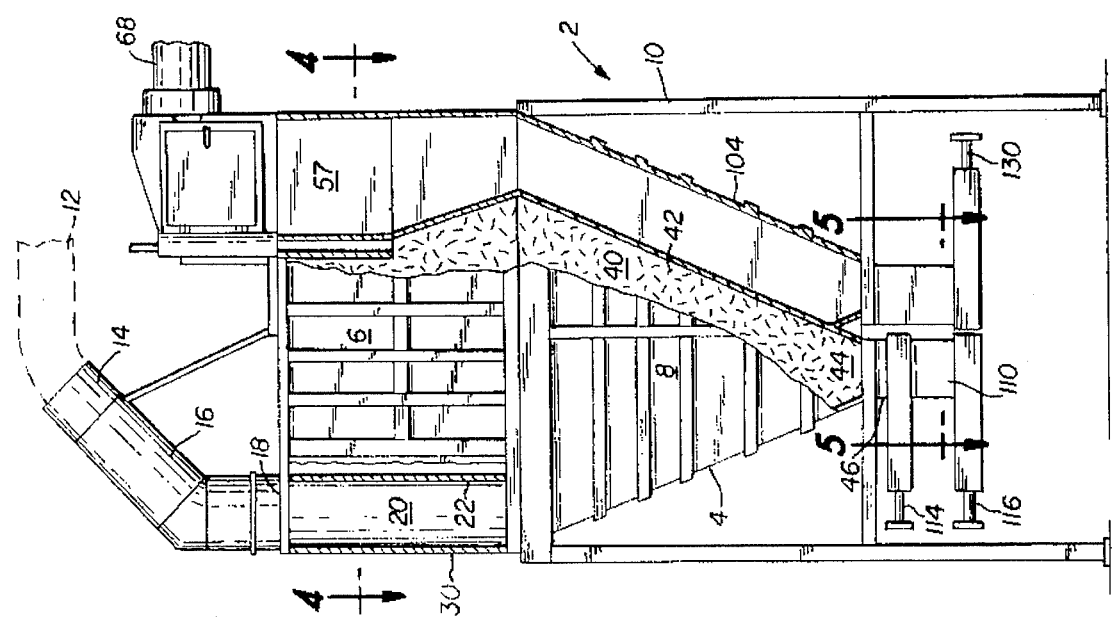
FIG. 1 is a front elevational view with parts removed of the apparatus of this invention.
Figure 2:
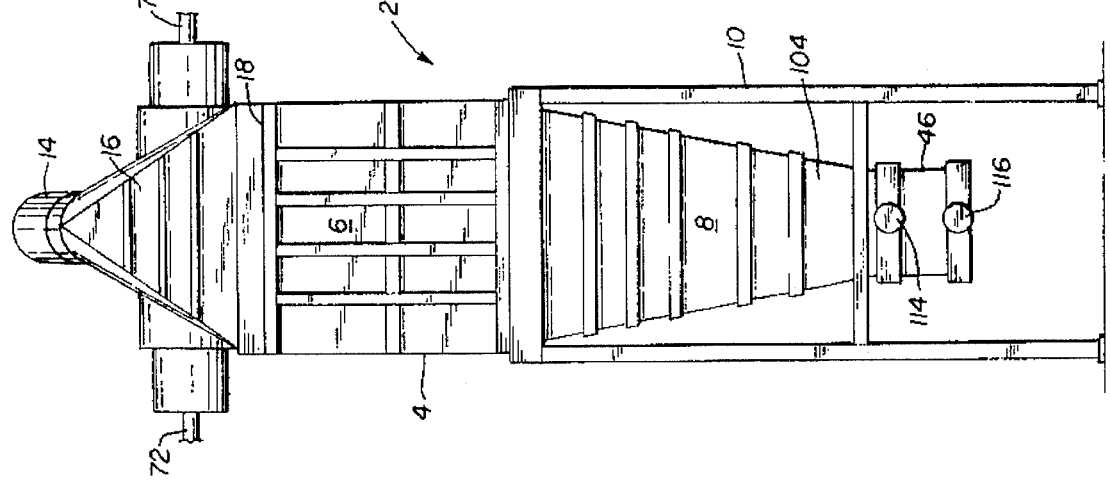
FIG. 2 is a side elevational view from the left side of FIG. 1.
Figure 3:
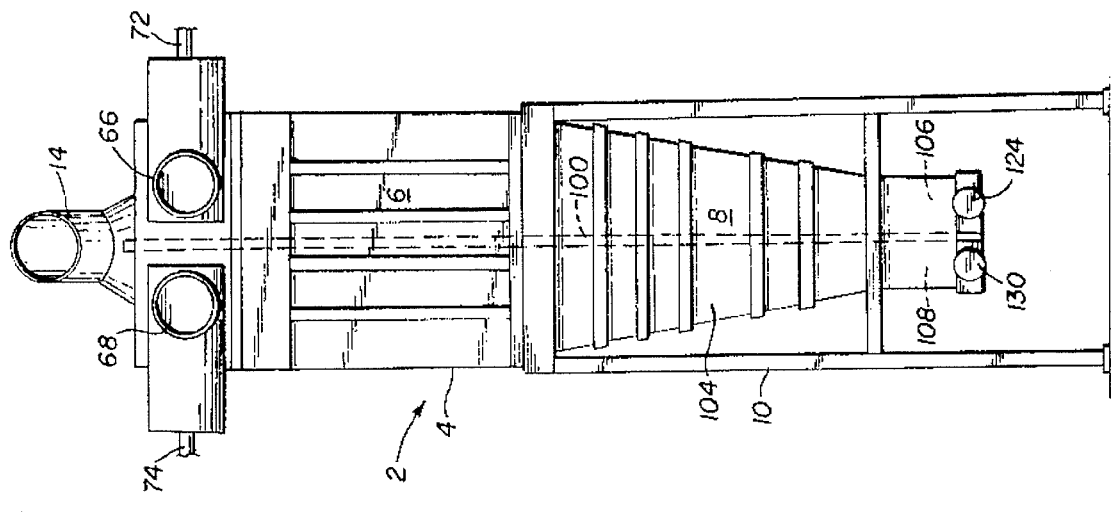
FIG. 3 is a side elevational view from the right side of FIG. 1.

In FIGS. 1–3, there is illustrated apparatus 2 of this invention having a housing 4 having an upper portion 6 and a lower portion 8. As illustrated in FIGS. 1–4, the upper portion 6 has a rectangular cross-sectional configuration. As illustrated in FIGS. 1–3, the lower portion 8 has the shape of an inverted, truncated, fours-sided pyramid. A support frame 10 supports the housing 4.

Figure 4:
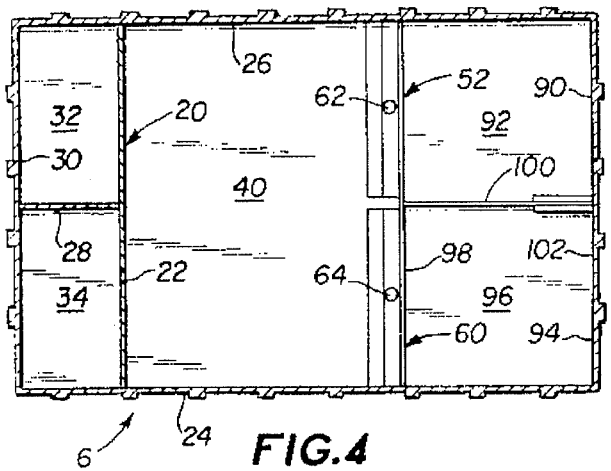
FIG. 4 is a cross-sectional view taken on the line 4—4 of FIG. 1.

An inlet conduit 12 has one end (not shown) that is connected to a vacuum head (not shown) that is located over a conveyor (not shown) having low density solids and crushed glass located thereon. The vacuum head sucks off the low density solids which are contained in an airflow moving through the inlet conduit 12. The other end 14 of the inlet conduit 12 is connected to an expansion chamber 16 in which the velocity and pressure of the airflow moving into the expansion chamber 16 is reduced. The expansion chamber 16 is connected to an opening 18 in the top wall of the upper portion 6. A first conduit 20 is mounted in the housing 4 and, as illustrated in FIG. 4, comprises an integral panel 22 extending between and secured to the front wall 24 and the back wall 26 of the upper portion 6. A central baffle plate 28 extends between and is secured to the integral panel 22 and a sidewall 30 of the upper portion 6 to divide the first conduit 20 into two passageways 32 and 34. The cross-sectional area of the passageways 32 and 34 is substantially equal to the largest cross-sectional area of the expansion chamber 16 so that the velocity and pressure of the first airflow in the first conduit 20 remains substantially the same as that leaving the expansion chamber 16.

The first airflow exits from the first conduit into a separating chamber 40 which has a cross-sectional area that is substantially greater than the cross-sectional area of the passageways 32 and 34. Therefore, the velocity and pressure of a second airflow in the separating chamber 40 is substantially less than the velocity and pressure of the first airflow so that a substantial portion of the low density solids 42 fall out of the second airflow and drop down into the bottom portion 44 of the lower portion 8. The bottom portion 44 is connected to a first collection means 46 through which the separated low density solids are removed as explained below.

Figure 6:
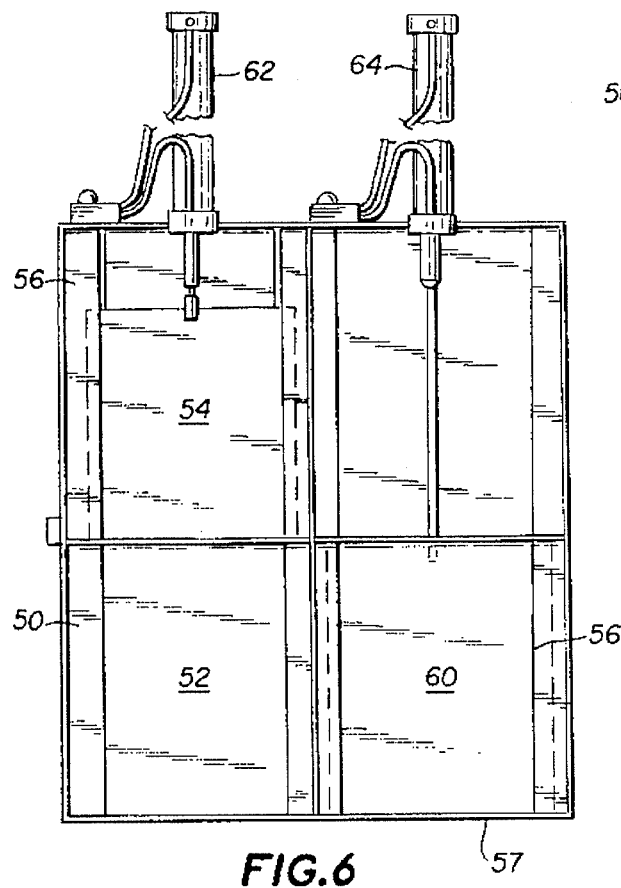
FIG. 6 is an elevational view of two gates.
Figure 7:
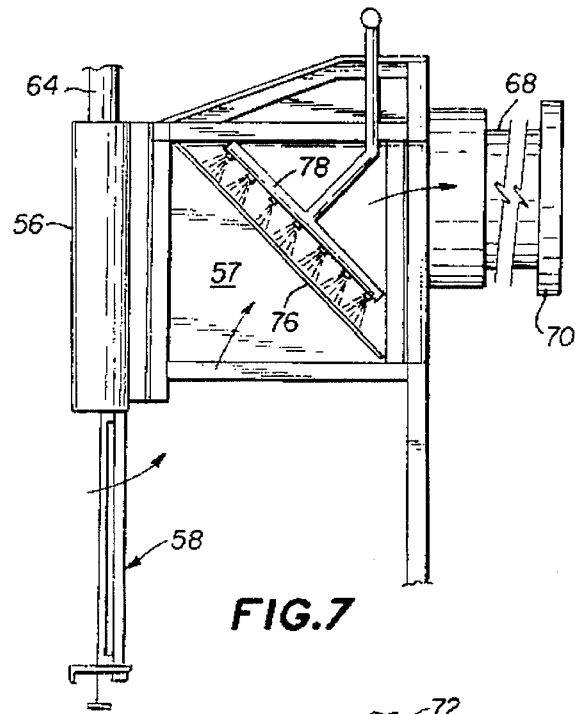
FIG. 7 is an elevational view with parts removed illustrating an airflow.
Figure 8:
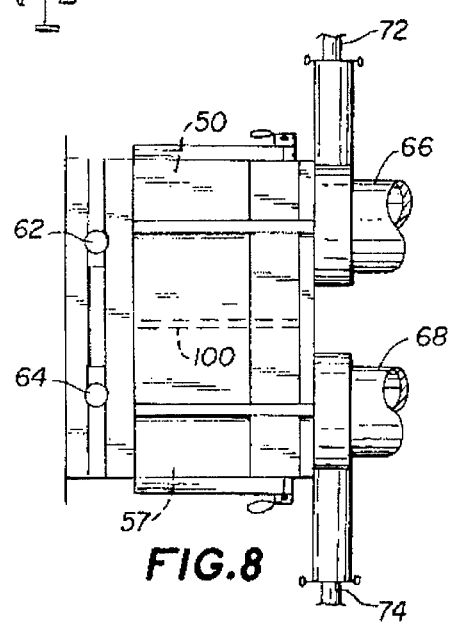
FIG. 8 is a top plan view of FIG. 7.

A second conduit 50 has an entrance opening 52 facing the separating chamber 40. A first slidable gate 54 is mounted for sliding movement on a frame 56 to open or close the entrance opening 52. A third conduit 57 has an entrance opening 58 facing the separating chamber 40. A second slidable gate 60 is mounted for sliding movement on the frame 56 to open or close the entrance opening 58. As illustrated in FIG. 6, air cylinders 62 and 64 are used to move the first and second slidable gates 54 and 60. However, it is understood that any other conventional means may be used to move the first and second slidable gates 54 and 60. Any conventional guide means, such as opposing rollers or recessed channels, may be used to guide the movement of the first and second slidable gates 54 and 60. The second and third conduits 50 and 57 have exit conduits 66 and 68 that are connected to a blower 70 that induces the first airflow, the second airflow and a third airflow alternately in the second and third conduits 50 and 57. If desired, a dust collector (not shown) may be located between the exit conduits 66 and 68 and the blower 70. A third slidable gate 72 is mounted to open or close the entrance to the exit conduit 66 and a fourth slidable gate 74 is mounted to open or close the entrance to the exit conduit 68. A filtering screen 76 is mounted in each of the second and third conduits 50 and 57 and is located between entrance openings 52 and 58 and the exit conduits 66 and 68 and functions to remove additional low density solids from the third airflow moving through the second and third conduits 50 and 57. Air nozzle means 78 are mounted to blow off the additional low density solids collected on the filtering screen 76.

A fourth conduit 90, FIG. 4, is formed in the housing 4 and has an opening 92 in communication with the second conduit 50. A fifth conduit 94 is formed in the housing 4 and has an opening 96 in communication with the third conduit 57. The fourth and fifth conduits 90 and 94 are formed by an integral panel 98 extending between and secured to the front and back walls 24 and 26 in the upper and lower portions 6 and 8 and a central baffle plate 100 extending between and secured to the integral panel 98 and sidewalls 102 of the upper portion 6 and 104 of the lower portion 8. Second collection means 106 are at the lower end of the fourth conduit 90 and a third collection means 108 are located at the lower end of the fifth conduit 94.

Figure 5:
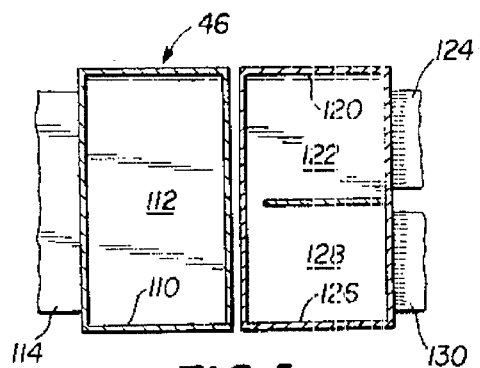
FIG. 5 is a cross-sectional view taken on the line 5—5 of FIG. 1.

The first collection means 46 comprise a sixth conduit 110, FIGS. 1 and 5, having a passageway 112. A fifth slidable gate 114 is mounted on the sixth conduit 110 for sliding movement between a first location for preventing movement of the substantial portion of the removed low density solids through a first portion of the passageway 112 and a second location for permitting movement of the removed low density solids through the first portion of the passageway 112. A sixth slidable gate 116 is mounted on the sixth conduit 110 for sliding movement between a first location for preventing movement the substantial portion of the removed low density solids 44 through a second portion of the passageway 112 and a second location for permitting movement of the substantial portion of the removed low density solids through the second portion of the passageway 112 as described below.

The second collection means 106 comprise a seventh conduit 120, FIG. 5 having a passageway 122. An eighth slidable gate 124 is mounted on the seventh conduit 120 for sliding movement between a first location for preventing movement of the additional low density solids through the passageway 122 and a second location for permitting movement of the additional low density solids through the passageway 122.

The third collection means 108 comprise an eighth conduit 126, FIG. 5, having a passageway 128. A ninth slidable gate 130 is mounted on the eighth conduit 126 for sliding movement between a first location for preventing movement of the additional low density solids through the passageway 128 and a second location for permitting movement of the additional low density solids through the passageway 128.

In operation, an airflow containing low density particles moves through the entrance conduit 12 into the expansion chamber 16 wherein the velocity and pressure thereof is reduced. A first conduit 20 is mounted in the upper portion 6 and is connected to the end of the expansion chamber 16 so that a first air flow moves through the first conduit 20. The cross-sectional area of the first conduit is substantially the same as the largest cross-sectional area of the expansion chamber so that the velocity and pressure of the first airflow is substantially the same as that of the airflow leaving the expansion chamber 16.

The first airflow moves out of the first conduit 20 into the separating chamber 40 which has a cross-sectional area that is substantially greater than tile cross-sectional area of the first conduit 20. Therefore, a second airflow in the separating chamber 40 has a velocity and pressure that is substantially less than the velocity and pressure of the first airflow. This reduction in velocity and pressure permits the low density solids to fall out of the second air flow and settle to the bottom of the separating chamber 40. First collection means 46 are located at the bottom of the separating chamber 40. Between about 92 to 97 percent of the low density solids in the first airflow are removed in the separating chamber 40.

Second and third conduits 50 and 57 are mounted in the upper portion 6 and have openings 52 and 58 facing the separating chamber 40. First and second slidable gates 54 and 60 are provided for opening or closing the openings 52 and 58 so that a third airflow moves through second conduit 50 or third conduit 57. Exit conduits 66 and 68 are connected to the second and third conduits 50 and 57 and are connected to a blower means 70 which induces the first, second and third airflows. Third and fourth slidable gates 72 and 74 are mounted to open or close the exit conduits 66 and 68. A filtering screen 76 is mounted in the second and third conduits 50 and 57 and functions to remove substantially all of the remaining low density solids in the third airflow. Air nozzle means 78 are mounted in the second and third conduits to blow off the low density solids collected on the filtering screens 76.

In the operation of the first collection means 46, the fifth slidable gate 114 and the sixth slidable gate 116 are normally in a closed position. When it is desired to remove the separated low density solids, the fifth slidable gate 114 is moved to the opened location so that at least a portion of the separated low density solids fall onto the sixth slidable gate 116. The fifth slidable gate 114 is then moved to the closed location and the sixth slidable gate 116 is moved to the opened position so that the separated low density solids will fall into a collection hopper (not shown). This process is repeated to remove the separated low density solids.

In the operation of the second collection means 106, the first slidable gate 54 and the third slidable gate 72 are moved to a closed position and the air nozzle means 78 are operated to remove the additional low density solids which fall through passageway 92 and passageway 122. At the same time, the eighth slidable gate 124 is moved to the opened location so that the removed additional low density solids move through the passageway 122 into a collection hopper (not shown). During the operation of the second collection means 106, the second and fourth slidable gates 60 and 74 are in the opened locations.

In the operation of the third collection means 108, the second and fourth slidable gates 60 and 74 are moved to the closed positions and the air nozzle means 78 are operated to remove the additional low density solids from the filtering screen 76 which fall through the passageways 96 and 128. At the same time, the ninth slidable gate is moved to the opened location so that the removed additional low density solids move through the passageway 128 into a collection hopper (not shown). During the operation of the third collection means 108, the first and third slidable gates 54 and 72 are in the opened location. The filtering screens 76 in the second and third conduits 50 and 56 function to remove substantially all of the low density solids from the third airflow.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. Apparatus for separating low density solids from an airflow comprising:

a housing having an entrance opening;

a first conduit in said housing connected to said entrance opening for receiving a first airflow containing low density solids;

said housing having a separating chamber formed therein for separating a substantial portion of said low density solids;

a second conduit mounted in said housing and having an entrance opening facing said separating chamber;

a third conduit mounted in said housing and having an entrance opening facing said separating chamber;

blower means for inducing said first air flow, a second air flow in said separating chamber and a third air flow alternately in said second or third conduit;

a first gate mounted on said second conduit for sliding movement relative to said entrance opening thereof to open or close said entrance opening to said separating chamber;

a second gate mounted on said third conduit for sliding movement relative to said entrance opening thereof to open or close said entrance opening to said separating chamber; and first collection means in said separating chamber for collecting said substantial portion of said low density solids.

2. Apparatus as in claim 1 and further comprising:

each of said second and third conduits having an exit opening;

filtering means in each of said second and third conduits for separating additional low density solids from said third airflow; and said filtering means located in said second and third conduits between said entrance opening and said exit opening.

3. Apparatus as in claim 2 and further comprising:

a third gate mounted on said second conduit for sliding movement relative to said exit opening thereof to open or close said exit opening; and a fourth gate mounted in said third conduit for sliding movement relative to said exit opening thereof to open or close said exit opening.

4. Apparatus as in claim 3 and further comprising:

first removing means for removing said additional low density solids from said filtering means in said second conduit;

second removing means for removing said additional low density solids from said filtering means in said third conduit;

a fourth conduit mounted in said housing and having one end portion having an opening in communication with said second conduit;

second collection means connected to the other end portion of said fourth conduit for collecting said additional low density solids removed from said filtering means in said second conduit; and a fifth conduit mounted in said housing and having one end portion having an opening in communication with said third conduit; and third collection means connected to the other end portion of said fifth conduit for collecting said additional low density solids removed from said filtering means in said third conduit.

5. Apparatus as in claim 4 wherein said at least some of said low density solids and said additional low density solids comprise:

paper, plastic, foil, cork, and wood.

6. Apparatus as in claim 1 wherein:

said separating chamber having a cross-sectional area that is substantially greater then the cross-sectional areas of the first, second or third conduits so that said second air flow has velocity and pressure that is substantially less than the velocity and pressure of said first and third air flows so that said substantial portion of said low density solids fall out of said second air flow.

7. Apparatus as in claim 6 and further comprising:

each of said second and third conduits having an exit opening;

filtering means in each of said second and third conduits for separating additional low density solids from said third airflow; and said filtering means located in said second and third conduits between said entrance opening and said exit opening.

8. Apparatus as in claim 7 and further comprising:

a third gate mounted on said second conduit for sliding movement relative to said exit opening thereof to open or close said exit opening; and a fourth gate mounted in said third conduit for sliding movement relative to said exit opening thereof to open or close said exit opening.

9. Apparatus as in claim 8 and further comprising:

first removing means for removing said additional low density solids from said filtering means in said second conduit;

second removing means for removing said additional low density solids from said filtering means in said third conduit;

a fourth conduit mounted in said housing and having one end portion having an opening in communication with said second conduit;

second collection means connected to the other end portion of said fourth conduit for collecting said additional low density solids removed from said filtering means in said second conduit; and a fifth conduit mounted in said housing and having one end portion having an opening in communication with said third conduit; and third collection means connected to the other end portion of said fifth conduit for collecting said additional low density solids removed from said filtering means in said third conduit.

10. Apparatus as in claim 9 wherein said housing comprises:

an upper portion having a generally rectangular cross-sectional configuration; and a lower portion in the shape of an inverted truncated four sided pyramid.

11. Apparatus as in claim 9 wherein said first conduit, said second and third conduits and said fourth and fifth conduits comprise:

an integral front wall, an integral back wall, integral opposite side walls and a central baffle plate extending between and secured to said front and back walls.

12. Apparatus as in claim 9 wherein said first collection means comprise:

a sixth conduit having an end portion having an opening facing said separating chamber;

a fifth gate mounted on said sixth conduit for sliding movement between a first location or preventing movement of said substantial portion of said low density solids through said sixth conduit and a second location for permitting movement of said substantial portion of said low density solids through at least a portion of said sixth conduit; and a sixth gate mounted on said sixth conduit for sliding movement between a first location for preventing movement of said substantial portion of said low density solids through another portion of said sixth conduit and a second location for permitting movement of said substantial portion of said low density solids through said another portion of said sixth conduit.

13. Apparatus as in claim 12 wherein said second collection means comprise:

a seventh conduit having an end portion connected to said other end portion of said fourth conduit;

an eighth gate mounted on said seventh conduit for sliding movement between a first location for preventing movement of said additional low density solids through said seventh conduit and a second location for permitting movement of said additional low density solids through said seventh conduit.

14. Apparatus as in claim 13 wherein said third collection means comprise:

a eighth conduit having an end portion connected to said other end portion of said fifth conduit; and a ninth gate mounted on said eighth conduit for sliding movement between a first location for preventing movement of said additional low density solids through said eighth conduit and a second location for permitting movement of said additional low density solids through said eighth conduit.

15. Apparatus as in claim 14 wherein said at least some low density solids and said additional low density solids comprise:

paper, plastic, foil, cork, and wood.

16. A method for separating low density solids from an airflow comprising:

moving a first airflow containing low density solids through a first conduit at a predetermined velocity and pressure into a separating chamber;

moving a second airflow through said separating chamber at a velocity and pressure substantially less than said velocity and pressure of said first airflow to separate a substantial portion of said low density solids from said second airflow;

collecting said substantial portion of said low density solids from said separating chamber;

moving a third airflow out of said separating chamber through a second or a third conduit at a velocity and pressure substantially equal to the velocity and pressure of said first airflow wherein each of said second and third conducts has an entrance portion and an exit portion and a slidable gate to open or close each of said entrance or exit portions;

passing said third airflow in said second or third conduit through filtering means to deposit additional low density solids on said filtering means;

opening said slidable gates at said entrance and exit portions of one of said second or third conduits;

closing said slidable gates at said entrance and exit portions of the other of said second or third conduits;

cleaning said filtering means in said other of said second or third conduits to remove said additional low density solids therefrom; and collecting said additional low density solids.

17. A method as in claim 16 and further comprising:

passing said third airflow through filtering means in said second or third conduits to separate additional low density solids out of said third airflow.

18. A method as in claim 17 and further comprising:

creating a vacuum in said second or third conduits to induce said first, second and third airflows.

19. A method as in claim 16 and further comprising:

creating a vacuum in said second or third conduits to induce said first, second and third airflows.

\* \* \* \* \*